No. 716,046. Patented Dec. 16, 1902.
A. H. HUTH.
SPRING WHEEL.
(Application filed Sept. 15, 1902.)
(No Model.)
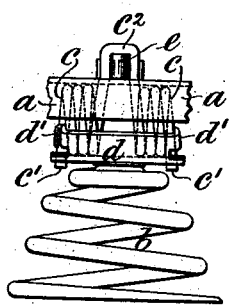
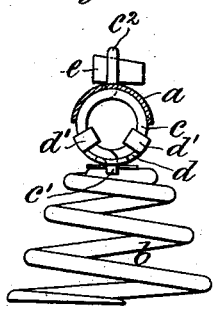
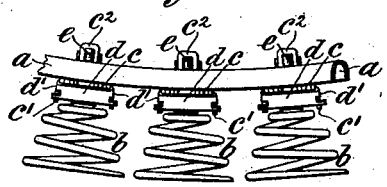
Witnesses.
A. M. Parkins.
M. M. O'Connor.
Inventor:
Alfred Henry Huth,
By his Attorneys,
Baldwin, Davidson & Wight.
THE NORRIS PETERS CO., PHOTO-LITHO., WASHINGTON, D. C.

UNITED STATES PATENT OFFICE.

ALFRED HENRY HUTH, OF MIDDLESEX COUNTY, ENGLAND.

SPRING-WHEEL.

SPECIFICATION forming part of Letters Patent No. 716,046, dated December 16, 1902.

Application filed September 15, 1902. Serial No. 123,507. (No model.)

*To all whom it may concern:*

Be it known that I, ALFRED HENRY HUTH, esquire, a subject of the King of Great Britain, residing at 58 Rutland Gate, in the county of Middlesex, England, have invented certain new and useful Improvements in Spring-Wheels, of which the following is a specification.

My invention has for its object the construction of metal resilient spring-tires for all sorts of vehicles running on ordinary roads.

Although hitherto many attempts have been made to find an efficient substitute for the pneumatic tire, these have all been more or less unsuccessful, either because they seek to make a continuous metal rim resilient and elastic or make use of a series of metal springs around the rim which are rigid in every direction save the perpendicular.

The object of this invention is to avoid these errors. I employ a series of springs around the rim of such a size and distance apart that they run like a continuous rim, while the return of each separate spring as the revolving wheel removes the pressure has precisely the same effect as the pneumatic tire. The springs, moreover, are free to move in every direction, so as to yield to inequalities in the road, just as the air in a pneumatic tire yields to varying pressures. The way I achieve these results is shown in the annexed drawings.

Figure 1 is a side elevation of part of a tire; Fig. 2, a side elevation showing one of the springs to a larger section, and Fig. 3 a transverse section.

The wheel has a rigid rim $a$, from which the springs $b$ project radially, the rim being preferably in the form of an endless semicircular trough, with the concavity outward. The springs may be fixed directly by their apices to the rim; but I prefer to fix them to the free ends $c'$ of a pair of helical springs $c$, which are fitted to the trough of the rim. Between these helical springs and the main springs may be fitted a semicircular trough $d$, with the concavity inward, of the same diameter as the trough of the rim to which the apex of the main spring is fixed and which is itself fixed to the helical springs, their ends $c'$ passing through holes in it and being further secured to them by means of the turned-in tongues $d'$ at its ends. The helical springs are preferably oppositely wound from a single piece of wire having a loop $c^2$ formed at its middle, which passes through a slot in the rim $a$ and is secured by a key $e$.

What I claim is—

1. In a wheel-tire the combination of a trough-shaped rim with its concavity outward pairs of helical springs lying in the trough and having their adjacent ends fixed to it a series of radially-projecting coiled springs and means for connecting the inner end of each coiled spring to the other ends of a pair of the helical springs.

2. In a wheel-tire the combination of a trough-shaped rim with its concavity outward pairs of helical springs lying in the trough and having their adjacent ends fixed to it, a series of radially-projecting conical coiled springs and means for connecting the apex of each coiled spring to the other ends of a pair of the helical springs.

3. In a wheel-tire the combination of a trough-shaped rim with its concavity outward pairs of helical springs lying in the trough and having their adjacent ends fixed to it a series of radially-projecting coiled springs a series of short troughs with their concavity inward and means for fixing each trough to the inner end of one of the coiled springs and to the other ends of a pair of the helical springs.

4. In a wheel-tire the combination of a trough-shaped rim with its concavity outward pairs of helical springs lying in the trough and having their adjacent ends fixed to it, a series of radially-projecting conical coiled springs a series of short troughs with their concavity inward and means for fixing each trough to the apex of one of the conical springs and to the other ends of a pair of the helical springs.

ALFRED HENRY HUTH.

Witnesses:
GEO. P. S. KELSEY,
A. R. PALMER.